United States Patent [19]

Slavin et al.

[11] Patent Number: 5,819,234
[45] Date of Patent: Oct. 6, 1998

[54] TOLL COLLECTION SYSTEM

[75] Inventors: Fred Slavin, Manalapan; Randy J. Schafer, East Brunswick, both of N.J.

[73] Assignee: The Chase Manhattan Bank, New York, N.Y.

[21] Appl. No.: 681,712

[22] Filed: Jul. 29, 1996

[51] Int. Cl.[6] .................................................. G07B 15/00
[52] U.S. Cl. .......................... 705/13; 235/375; 235/381; 235/384; 340/825.31; 340/825.35; 705/471
[58] Field of Search .................................. 235/375, 380, 235/381, 382, 384; 340/825.3, 825.31, 825.35, 928; 705/13, 417, 418

[56] References Cited

U.S. PATENT DOCUMENTS

| | | | |
|---|---|---|---|
| 3,602,881 | 8/1971 | Bayne et al. | 340/928 |
| 4,303,904 | 12/1981 | Chasek | 235/384 |
| 5,086,389 | 2/1992 | Hassett et al. | 705/13 |
| 5,101,200 | 3/1992 | Swett | 340/937 |
| 5,144,553 | 9/1992 | Hassett et al. | 364/401 |
| 5,204,675 | 4/1993 | Seline | 340/933 |
| 5,253,162 | 10/1993 | Hassett et al. | 364/405 |
| 5,310,999 | 5/1994 | Claus et al. | 235/384 |
| 5,351,187 | 9/1994 | Hassett | 364/401 |
| 5,422,473 | 6/1995 | Kamata | 235/384 |
| 5,424,727 | 6/1995 | Shieh | 340/928 |
| 5,440,109 | 8/1995 | Hering et al. | 235/384 |
| 5,451,758 | 9/1995 | Jesadanont et al. | 235/384 |
| 5,485,520 | 1/1996 | Chaum et al. | 380/24 |
| 5,490,079 | 2/1996 | Sharpe et al. | 364/467 |
| 5,525,991 | 6/1996 | Nagura et al. | 342/42 |
| 5,554,984 | 9/1996 | Shigenaga et al. | 340/937 |
| 5,602,375 | 2/1997 | Sunahara et al. | 235/384 |
| 5,602,919 | 2/1997 | Hurta et al. | 380/24 |
| 5,663,548 | 9/1997 | Hayashi et al. | 235/384 |

*Primary Examiner*—Edward R. Cosimano
*Attorney, Agent, or Firm*—Ostrolenk, Faber, Gerb & Soffen, LLP

[57] ABSTRACT

An automatic toll collection system comprises and operates in conjunction with transponders which are provided for sale to the public in sealed packages and which are pre-approved for a predetermined amount of prepaid toll credit. When the transponders are purchased, they can be installed in any vehicle and are immediately ready for use. The kit in which the transponder is sold includes application forms and a return mailer which permit the purchaser thereof to convert the preestablished anonymous account to a regular prepaid toll account and to authorize the automatic replenishment of the account, thus enabling continued use of the purchased transponder beyond the pre-approved amount. The invention further comprises the process of frequent updating, e.g. several times daily, hourly, etc. of toll plaza computers with toll transactions at all participating toll facilities, to prevent inadvertent overdrawing of toll accounts by motorists.

16 Claims, 9 Drawing Sheets

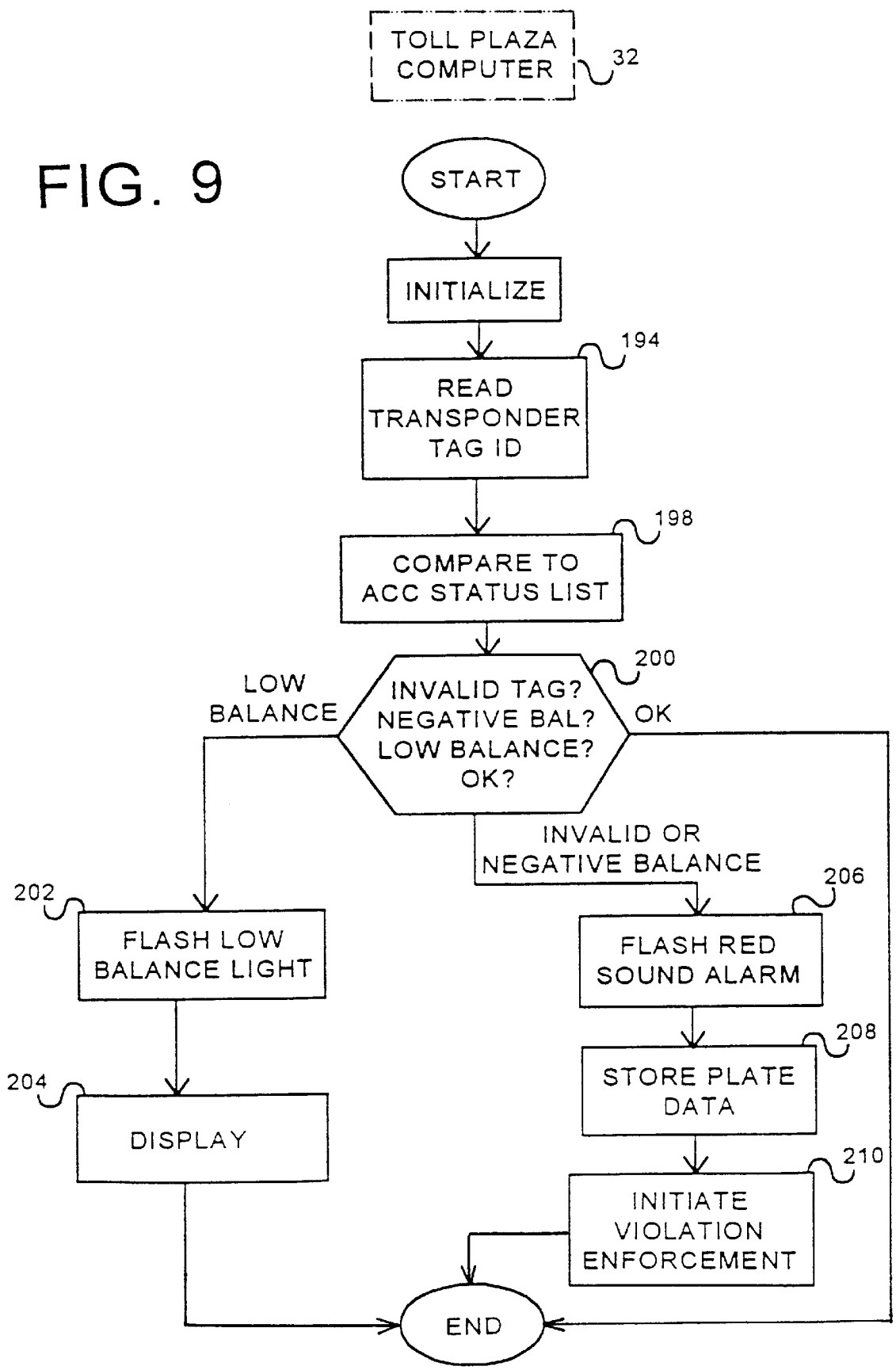

TOLL COLLECTION SYSTEM

BACKGROUND OF THE INVENTION

The present invention is directed to an electronic toll collection system and, more particularly, to a special transponder kit which is pre-authorized and bears a predetermined toll credit, so that it is usable immediately upon purchase from a transponder kit retail vendor.

Electronic toll collection offers public as well as private benefits, including reduced public payrolls, faster commercial and personal travel, reduced vehicular emissions, and reduced toll plaza size and congestion. Consequently, encouraging wide use of electronic toll collection presents a problem a solution of which provides public good and private opportunity. A large body of patent and general literature has been published over the past two decades describing various automatic toll collection systems which enable motorists to register and pay for travel through toll plazas without stopping to pay a toll. Such systems have recently begun to be commercialized and are now familiar to the general public.

One form of toll collection system is represented by the E-ZPass (a proprietary trademark) toll collection system which has been in use in the New York city metropolitan region, through a consortium or authority created by the joint efforts and cooperation of the road authorities of the states of New York and New Jersey. The E-ZPass toll collecting system is characterized by a centrally located computer which operates in conjunction with and communications with numerous satellite computers which are located in the variously located toll plazas.

The heart of the E-ZPass system resides in technically unsophisticated transponders, carried in vehicles, which permit themselves to be interrogated by signals produced at the toll plazas and which respond to those signals by transmitting a unique "tag number" identifying the transponder. This tag number is then associated with a pre-authorized account number in the central computer which reflects a prepaid dollar balance against which the toll is charged.

Although the E-ZPass system has been operating successfully, wider acceptance of the system has been hindered, in part due to the fact that many individuals have been discouraged from using the service due to the complexity of a special application process which requires communicating with the toll collecting authority, establishing an account for prepaid tolls, meeting credit authorization conditions, etc., all before they receive the transponder. The existing E-ZPass application process is complex, time consuming and inconsiderate of our present society's desire for instant gratification, i.e. the desire to purchase a transponder and be able to use it immediately. Also, the present system does not accommodate the small segment of the population which would like to purchase and use these toll charging transponders anonymously. These factors have discouraged and decreased to a degree the dissemination and acceptability of the E-ZPass system among a segment of the motoring public.

The aforementioned drawbacks of the existing E-ZPass system have actually been recognized in the prior art, as for example in U.S. Pat. No. 4,303,904 which was filed in October 1979 and decries the fact that "Present methods aimed at implementing such a service employ only automatic vehicle identification. Such methods require intricate centralized computer facilities for storing and extracting billing information from potentially tens of millions of possible users for each toll transaction. These methods lack flexibility and user connection. They also can create massive operational failures and a feeling on the part of users of being dependent on large, complex and silent computers."

Therefore, the U.S. Pat. No. 4,303,904 discloses a rather complex, vehicle-borne transponder which carries in its memory a pre-paid toll balance. Each time the transponder passes through a toll plaza, a toll amount is deducted from the on-board transponder until the pre-paid balance is exhausted.

The desire to sidestep the complexity of the centralized, stored-value database and complex computers and the ability to provide users with a transponder which is immediately usable is also reflected in a number of other patents which describe immediately usable, pre-paid in-tag stored value transponders. These patents include U.S. Pat. No. 3,602,881 which issued in 1971 on a transponder which includes a counter which may be set to store a number of pre-paid tolls, subtracting one toll for each passage.

In the same vein, U.S. Pat. No. 5,086,389 (Feb. 4, 1992) discloses an in-vehicle processor or transponder having a memory for storing a toll-money available-amount purchased by the user. When the vehicle passes through the toll facility, the facility transmits a toll-collect signal instructing the in-vehicle toll processor to debit the calculated toll from the memory of the transponder. Similarly, U.S. Pat. No. 5,101,200 (Mar. 31, 1992) describes a rather complex vehicle-borne transponder which permits the motorist to charge tolls directly through credit stored in the on-board transponder much like an office postage metering device.

U.S. Pat. Nos. 5,451,758 (September 1995) and 5,485,520 (Jan. 16, 1996) describe in-vehicle transponders which contain the equivalent of a smart card containing electronic money against which tolls are debited when the vehicle passes through the automatic toll collection lane of a toll plaza.

Thus, the above-described prior art underscores the desire of a segment of the population for a ready to use transponder, which avoids the delay and inconveniences of the impersonal E-ZPass system, which have discouraged some motorists from adopting socially beneficial electronic toll collection. Nonetheless, the various transponders of the prior art mentioned above present their own disadvantages and drawbacks, primarily because they are inherently more complex and costly and more prone to tampering and fraud, as compared to existing transponders used with the E-ZPass toll collection concept. For example, all of these smart card or resident stored value card suffer from the weakness of full utility in case of loss or theft. In contrast, the off-card stored value enables an owner to stop the use of a lost or stolen card.

SUMMARY OF THE INVENTION

Accordingly, a main object of the invention is to provide a method and associated apparatus which delivers the benefits of both the existing E-ZPass system and the ready-to-use and easy to purchase characteristics of transponder with pre-paid toll balances, while totally avoiding the loss or theft exposure and complexity of prior art pre-paid transponders.

It is a further object of the present invention to provide a toll collection system which enables motorists to purchase toll transponders in retail store settings and in a form which makes them immediately ready for use.

Yet another object of the present invention is to enable use of transponders which are simpler in construction and comparatively inexpensive.

A still further object of the invention is to provide a toll collection concept which encourages people to sign up and become regular users of the E-ZPass type toll collection system.

At the center of the concept of the present invention is a sealed kit containing a toll transponder, along with instructions for installation, installation hardware, an installation template, terms and conditions for service, a wallet-sized ID card with a transponder number and a customer service phone number, and an application form and a return mail envelop to establish a regular toll account, through which the purchaser of the sealed kit can prepay and maintain a positive toll balance in his or her account.

In preparation for distribution, the transponder is tested to make certain that it is in good working order. The transponder, which may be distributed by a participating retail establishment such as a Seven-Eleven® or Wal-Mart® or through the mail, is encoded at a central billing computer facility (CSC) with a predetermined toll balance amount, for example twenty five dollars. It is then enclosed in a protective foil wrapper to shield it from unintentional use and packaged in a sealed kit for distribution to vendors and sale.

The transponder is immediately usable at all toll facilities of participating consortia, for example at the toll plazas of the authority which operates the E-ZPass system in the New York metropolitan region. The customer purchases the package for a price which includes a refundable deposit on the transponder plus a fixed amount to fund the prepaid toll associated with the specific transponder. Once installed by the customer, the transponder is ready to be used, providing customer convenience and encouraging rapid adoption, even by those who may just be trying the service.

The merchandising approach of the present invention, entailing sale of pre-approved, prepaid transponders, fits the modern way of buying goods and services, for example electronic and software products, where the customer buys these products in a retail setting, begins to use them immediately, and then completes the warranty card, etc. from the comfort of his or her home.

This differs markedly from the conventional approach in which the customer must obtain the transponder from a special institution, e.g. a toll collection authority, located at a remote location, which requires filling out application forms, awaiting credit authorization checks and enduring the usual processing and mail delays. The existing approach makes customers hesitant to adopt the E-ZPass system. In contrast, the concept of the present invention involving the sale and distribution of sealed E-ZPass kits is more attractive in that it generates higher E-ZPass penetration for the toll collection authority more quickly and enables a more pleasant, convenient and satisfying experience for the customer.

Once purchased, the present invention's transponder's pre-paid toll account can be replenished by a variety of means including charge to a credit card; authorized debit; check; cash; electronic transfer, etc. This flexibility is an incentive to induce greater segments of the population to use it. The package wrapper and protective foil wrapper of the present invention will carry (preferably in large colorful type) customer notice that he or she should establish a value replenishment arrangement with the toll authority, so that the customer will not become a lane violator when the initial prepaid amount has been used up. To do so, all the customer must do is complete and submit a form, or call the authority, or contact the authority via the Internet to adopt one or more account replenishment procedures.

The process of the present invention includes steps to discourage individuals from opening and closing toll accounts to capture sign-up incentives that may be offered to promote purchase of the transponder kits of the invention. To this end, the system may monitor requests for transponder deposit refunds, to identify individuals who might attempt to take unfair advantage of attractive sign up pricing schemes (which are intended to be expressly prohibited in accordance with the terms and conditions of the purchase of the transponders of the present invention).

The above and other objects of the invention are realized through the provision of the aforementioned sealed transponder kit and the operation thereof in conjunction with the existing E-ZPass centralized computer system as summarized below.

The central computer includes and operates various software routines which, among other things, generate and store a first plurality of regular toll account numbers which are associated with a first plurality of transponders. Each of these transponders is assigned a unique tag number and includes a circuit for wirelessly communicating with a transmitter/receiver located at the toll plaza. The central computer also contains programs for correlating each regular account number with a corresponding individual and/or business entity which is to be billed for tolls charged against its tag number. These regular account numbers are activated in response to the receipt of transponder application forms and the prepayment of toll fees by individuals and/or business entities who have enrolled in E-ZPass under the existing system.

The computer system of the present invention further contains program facilities for pre-authorizing and activating a second plurality of anonymous accounts associated with a second plurality of transponders which, initially, are not associated with any user, but which nonetheless are pre-authorized to bear a predetermined prepaid toll amount. These transponders which are sold in the aforementioned sealed boxes comprise the second plurality (category) of transponders. When a vehicle passes through a toll plaza, the local receivers/transmitters sense the passage its transponder through the toll plaza, detect the tag number of the particular transponder and charge a toll amount to either the regular account associated with the transponder or, if the transponder is of the second category, to the corresponding anonymous account.

One of the aims and objectives of the present invention is to encourage transponders associated with the anonymous accounts to be converted to regular accounts, once the applications included with these transponders shall have been properly completed and returned with the required fees or other payment mechanism to the toll operating authority.

Other features associated with the system and method of the present invention include software routines for enabling automatic conversion of accounts from the anonymous type to the regular type, and activation of the second anonymous account types only after receipt of acknowledgement from the vendor of the transponder kits that the corresponding transponders have reached the retail vendor, to prevent transponder pilferage while the transponders are on route to the vendor. Further software resident in the CSC includes routines for verifying the no two transponders are assigned the same account numbers, for monitoring the balance of accounts and for the generating billing manifests and for otherwise attending to the servicing of the customer base. A still further feature of the invention is the provision of a "low balance" indication in the prepaid accounts, so that when that transponder passes through a toll plaza, an indication of a low balance can be provided to the driver to induce account replenishment.

The method of the present invention may further include executing software routines which result in the deactivation of anonymous toll accounts which have not been replenished after exhaustion of their prepaid toll amount.

Other features and advantages of the present invention will become apparent from the following description of the invention which refers to the accompanying drawings.

BRIEF DESCRIPTION OF THE DRAWINGS

FIG. 9 is a rudimentary program flowchart of the program executed at the toll plaza computers.

DETAILED DESCRIPTION OF EMBODIMENTS OF THE INVENTION

Figure 1:
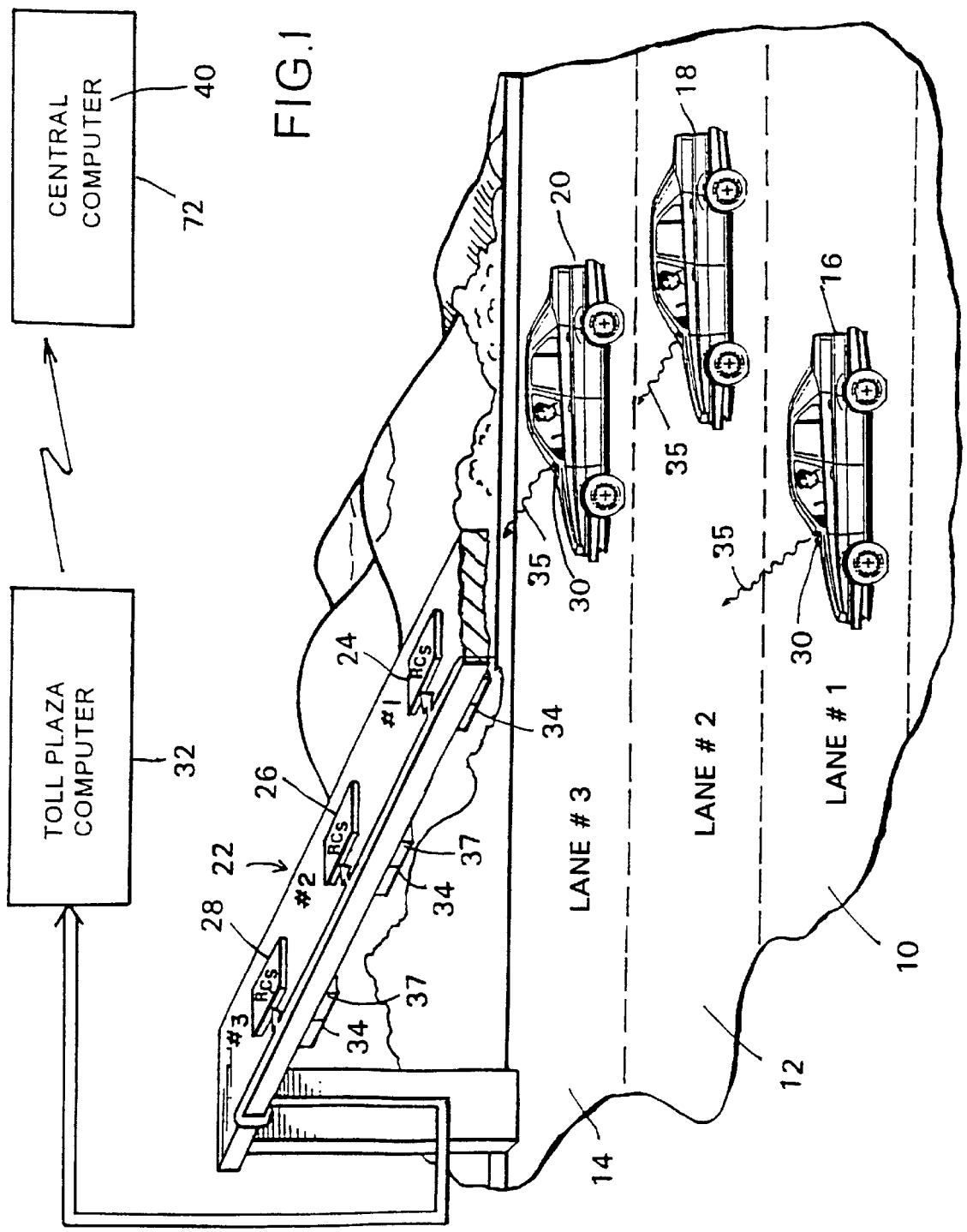
FIG. 1 is a perspective of a conventional toll plaza, illustrating the overall concept of the prior art E-ZPass system.

FIG. 1 illustrates the known prior art concept of an automatic toll collection plaza, showing a plurality of vehicle lanes 10, 12 and 14 over which vehicles 16, 18 and 20 travel toward the automatic toll collection facility 22. Each of the vehicles has mounted on its dashboard, or rear view mirror or anywhere else inside or outside the vehicle, a transponder 30 which receives and emits electromagnetic wave energy 35, to effect wireless communication with corresponding Roadside Collection Stations (RCS's) 24, 26 and 28. In typical and well known manner, each of the transponders 30 broadcasts a unique tag number associated therewith which is received and correlated by the RCS's with a toll account number of the vehicle.

Each vehicle account has associated with it a pre-paid toll credit and the toll amount is subtracted from the credit. Normally the RCS's communicate with a toll plaza computer[s] 32 which operates in conjunction with and periodically communicates with a remote and centrally located computer 40 located at a Customer Service Center 72, which updates the local plaza computer 32 as to the credit balances of the different vehicle accounts. When a vehicle has been properly detected and the toll amounts has been charged, the RCS's 24, 26, 28 have the means to operate appropriate signaling lights 34 to indicate that the transaction has been completed. All of this is accomplished in a fraction of a second and the vehicle need not stop at the toll plaza. However, if a vehicle should attempt to pass without a properly accredited transponder and/or if the vehicle account has been overdrawn, the RCS's 24, 26, 28 have the means to operate cameras (37) to record and store an image of the vehicle for later enforcement of a traffic violation.

In the known system of FIG. 1, the process of obtaining transponders is rather involved and slow. It requires a motorist to first obtain an application, fill in all types of personal and credit card data, and mail the application papers to the central authority and/or consortium which operates the various toll plazas. These applications then require processing at a central location, which process includes verification of credit authorization. After a considerable delay, an account is opened with a pre-paid balance which is charged to a credit card and a system is set up to periodically replenish the money credit in the account. Finally, a transponder having a tag number associated with the account is mailed or otherwise delivered to the motorist. This involved process can cause a delay of several weeks from the initial mailing of an application until the motorist receives a properly validated transponder.

Figure 2:
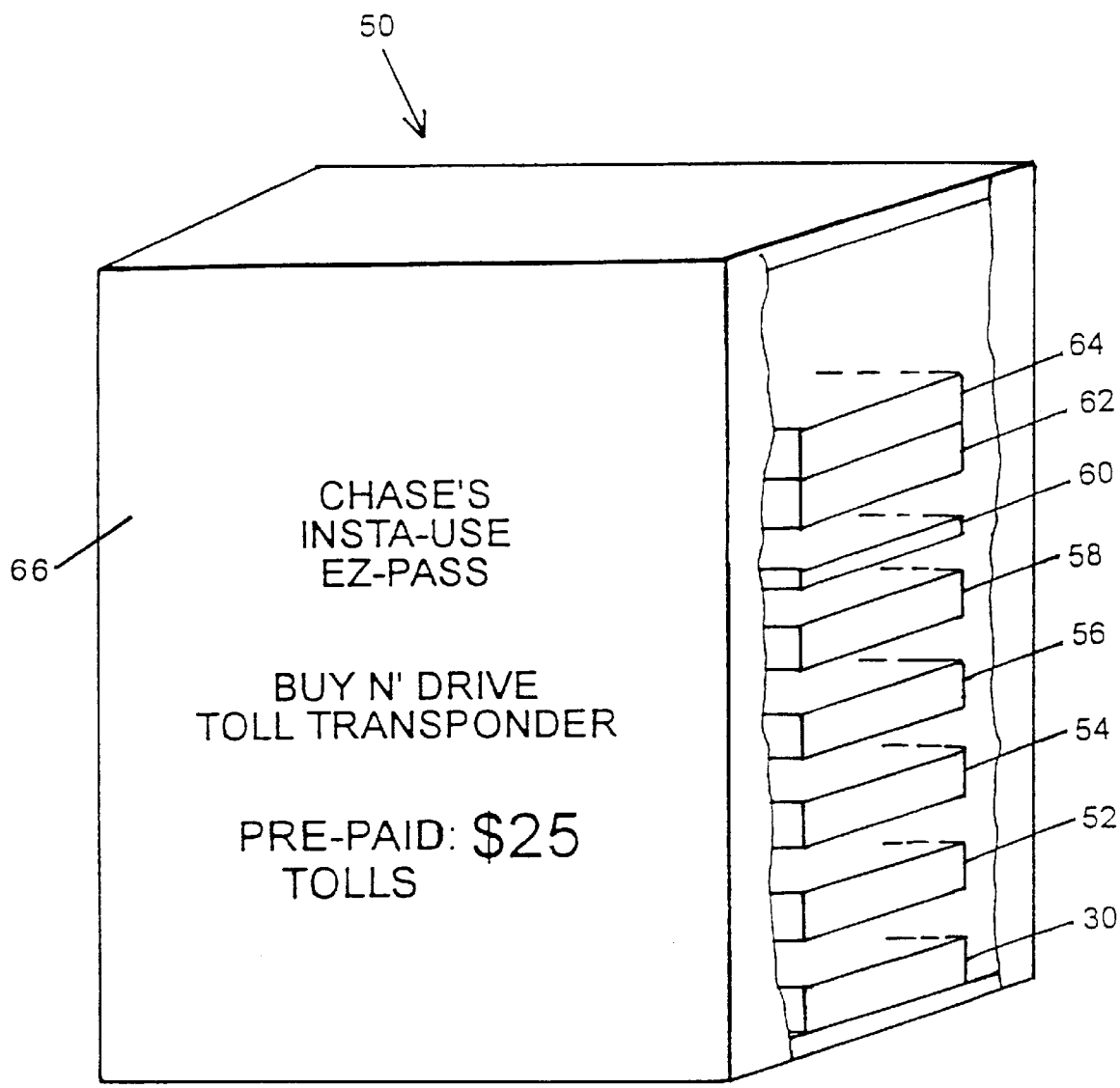
FIG. 2 is a perspective of a sealed kit containing a transponder, installation hardware and other components of an automatic toll transponder usable with the process of the present invention.

In marked contrast, the present invention discloses a system, process and apparatus which avoid the inconvenience of the involved application process described above. With reference to FIG. 2, a key component of the invention comprises the sealed kit 50 containing (as illustrated symbolically) the transponder 30, installation hardware 52, an installation template 54 and instructions for installation 56, terms and conditions for service 58, a wallet-sized ID card 60 with a transponder number and a customer service telephone number imprinted thereon, and an application form 62 and a return mail envelop 64. The application form 62 and return mail envelop 64 serve to establish a credit replenishment mechanism for the tag number associated with the transponder 30.

Thus, in very convenient and simple fashion, the consumer simply walks into a retail establishment, purchases the sealed kit 50, removes the transponder 30 and mounts it in his vehicle. The transponder 30 is in a form ready to be used. One of the panels 66 of the sealed kit 50, is imprinted with a the prepaid toll credit amount, for example, twenty five dollars. The purchaser now has available an initial twenty five dollars worth of toll credit which can be used immediately.

The present invention contemplates, however, that the purchaser will then use the application form 62 to establish a regular account with the toll collecting authority by including various information such as credit card or check account data and arranging for periodic replenishment of the account with funds sufficient to cover his or her monthly toll expenses, in accordance with the established E-ZPass toll concept. The overall software management routines responsible for establishing various toll accounts and for validating transponders is described further on.

Figure 3:
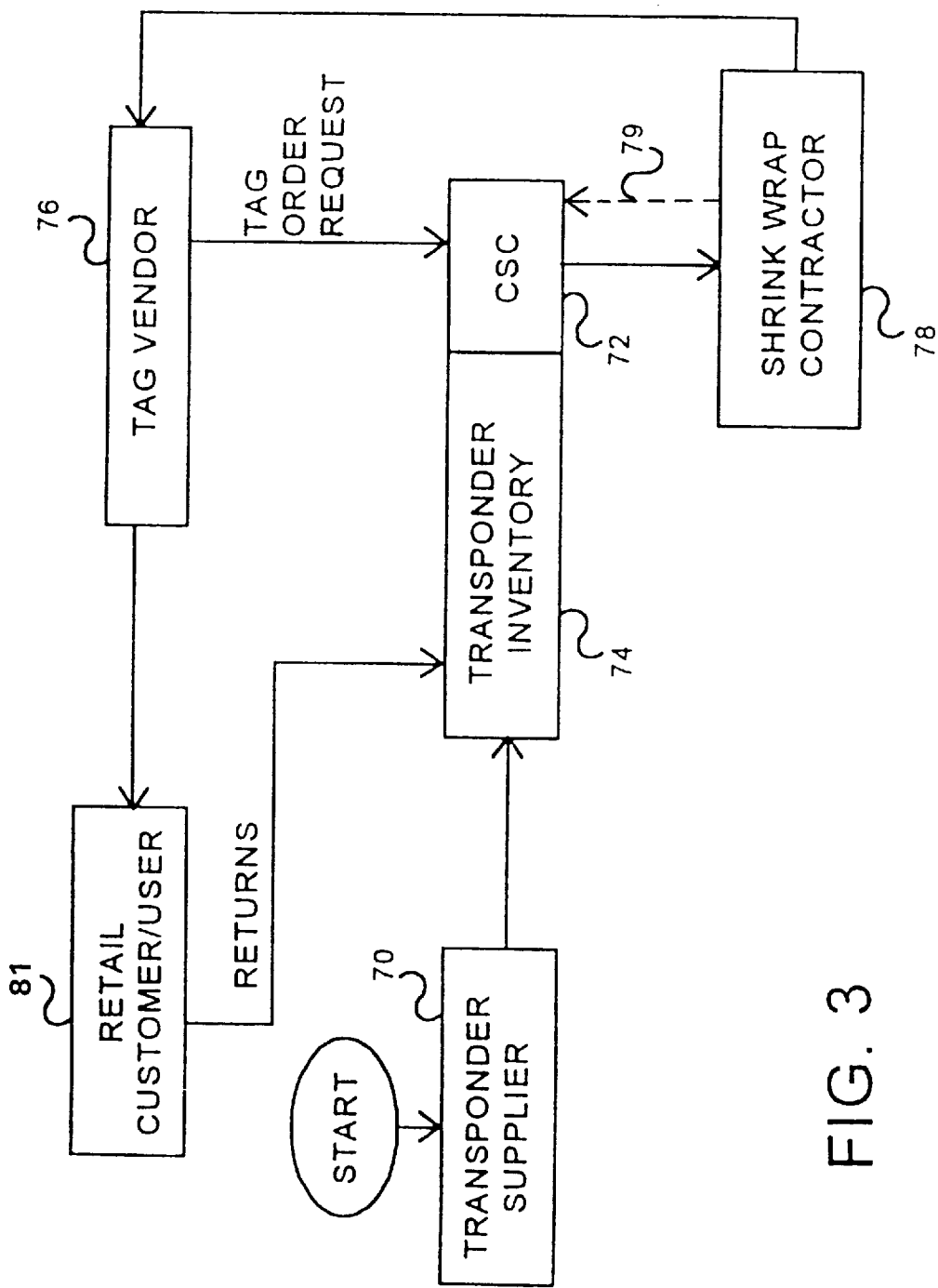
FIG. 3 is a block diagram illustrating the physical route traversed by transponders from the manufacturer/supplier thereof to the ultimate consumer, following the process of the present invention.

Referring first to FIG. 3, the physical path of the transponders 30, from the manufacturer thereof to the ultimate customers is as follows. Thus, the transponders are packaged in batch quantities with a unique tag number embedded in the circuitry of each transponder 30. These transponders are then shipped in batches from the transponder supplier 70 to the central toll collecting authority which operates and runs central computers at a customer service center (CSC) 72. The CSC 72 maintains a transponder inventory 74. In response to a request for a supply of tags (transponders) from a tag vendor 76, the operator at the CSC 72 retrieves a given number of transponders from the inventory 74 and runs certain programs (to be described) at the central computer which creates corresponding accounts for the retrieved transponders 30. These transponders are then shipped to a shrink-wrap contractor 78 which prepares the sealed boxes or kits 50 shown in FIG. 2. These kits 50 are then shipped by the contractor 78 to the tag vendor 76 directly (or through the CSC, as indicated at 79) which then sells them to the ultimate customer/user 81. The intention is that these customers will then use the included application form to establish a regular account. However, if a customer so desires he or she can return a transponder 30 to the customer service center 72 for credit in the form of an account replenishment, a cash credit, or the like.

Figure 4:
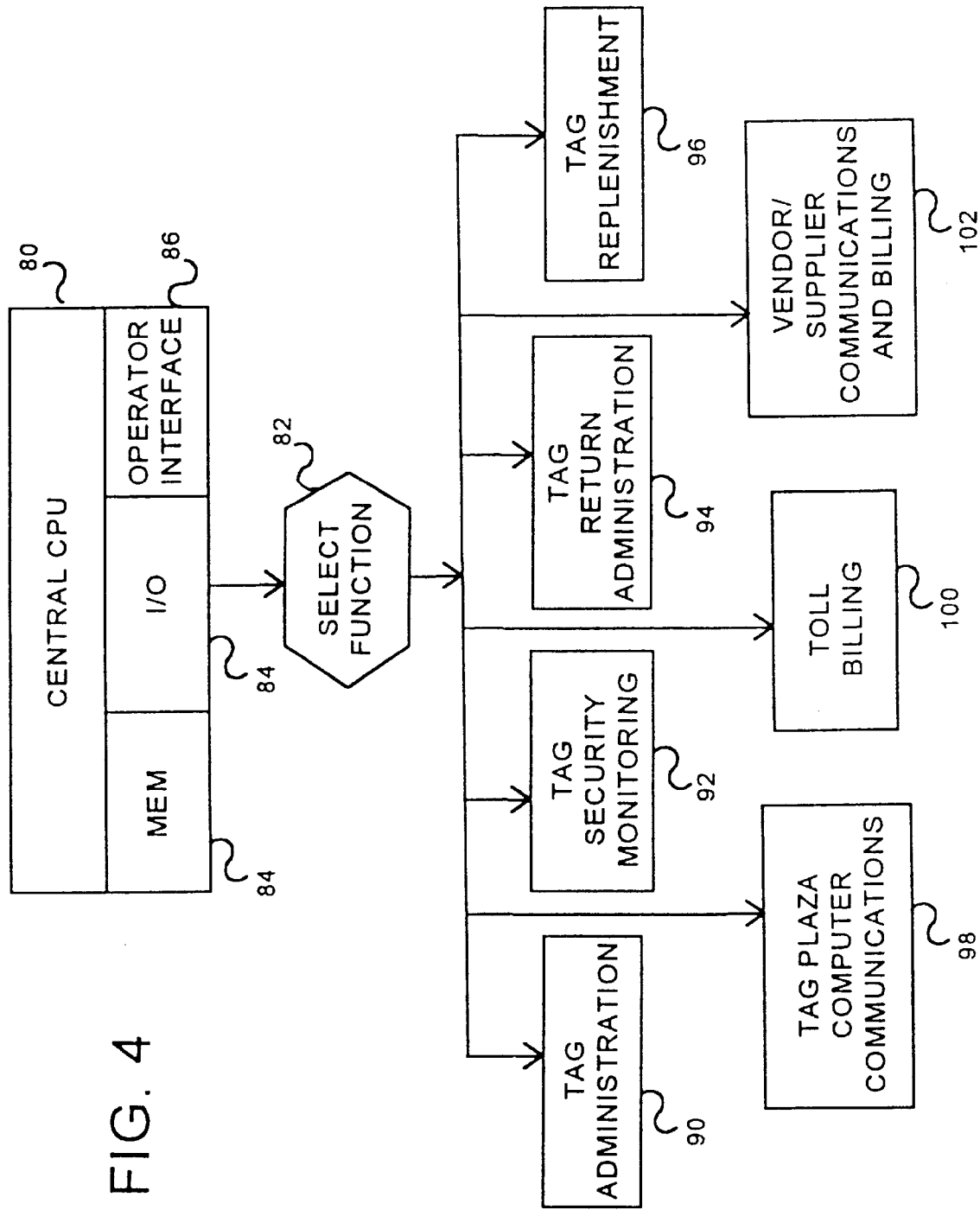
FIG. 4 is an overall block diagram indicating key software-based components of a Customer Service Center (CSC) central computer software of the present invention.

The customer service center 72 operates a massive central computer 80 (FIG. 4) which is able to keep track of huge amounts of computer data and transactions including millions of customers and toll transactions. Of course, instead of a single central computer 80, the central computer can consist of an array of tens or even hundreds of computers which operate in parallel or under control of a central computer. As illustrated in FIG. 4, some of the major functions performed by the central CPU 80 of the CSC 72 are selected at a function select block 82 which then directs the program to the appropriate area of the program.

In known manner, the central CPU 80 has the usual complement of memory devices 84 including internal semiconductor memory, mass storage devices such as magnetic storage devices, optical memory devices and the like. The central computer also operates IO devices 84 which are used to communicate with various peripherals such as printers, displays, modems for effecting communication with the toll plaza computers, with customers, vendors and other computer subsystems (not shown). The operator interface 86 enables operator communication and overall control of the massive software structure of the E-ZPass toll collection system.

The various functions performed by the CSC 72 include tag administration 90, tag security and monitoring 92, tag return administration 94, tag account replenishment 96, toll plaza communications 98, toll billing 100, vendor and supplier communications, billing 102 and much more.

Figure 5:
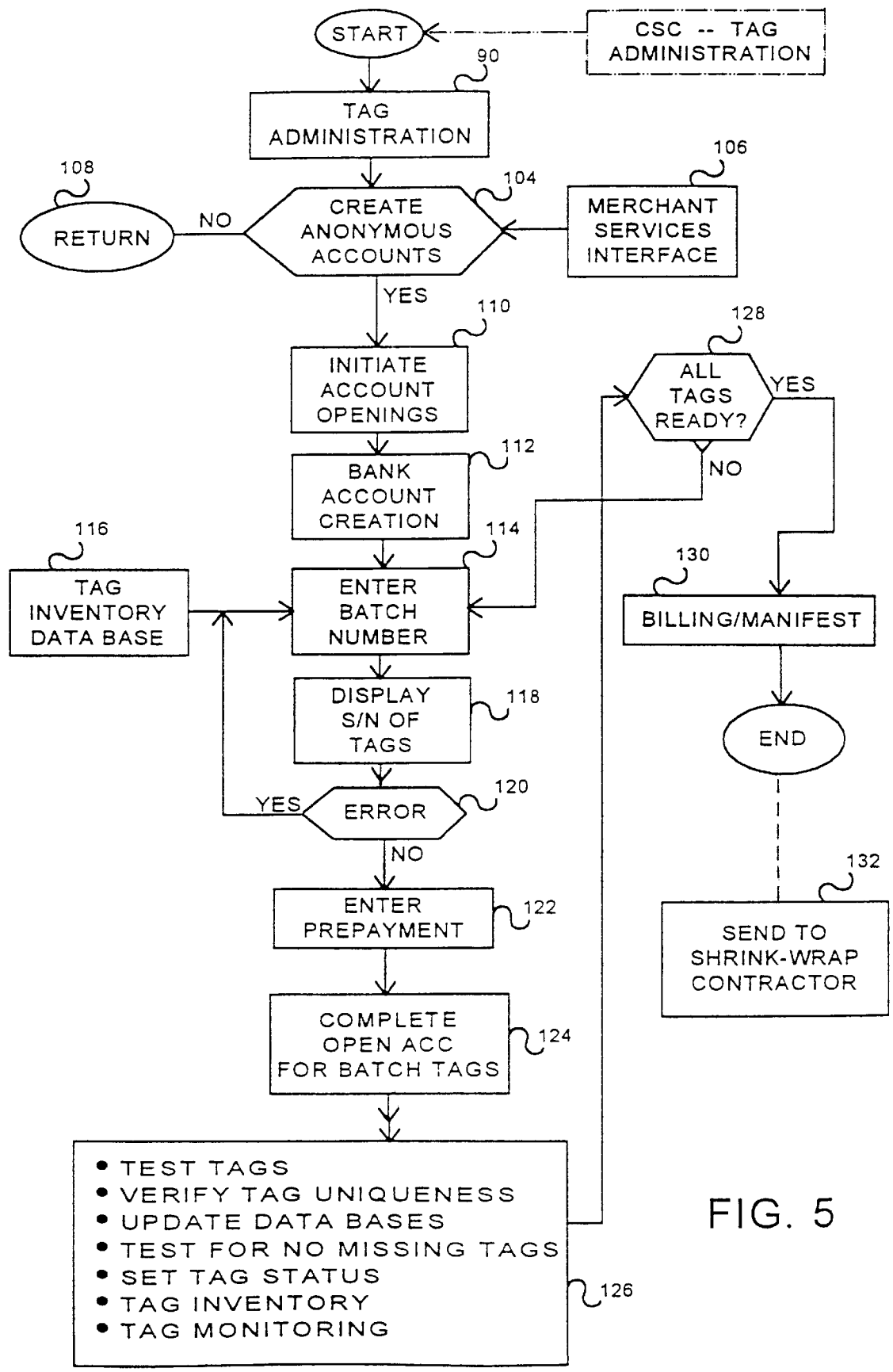
FIG. 5 is an overall software flowchart of the CSC program which handles the tag administration function of the present invention.

Turning now to FIG. 5, the tag administration 90 portion of the overall CSC program comprises at least the following major software blocks. Thus, the decisional block 104 communicates with the merchant services interface 106 to determine whether ordering requests had been received from the tag vendors for transponders 30. If not, this software block terminates at return block 108. Otherwise, the program proceeds to the initiation of account openings at block 110 where software routines are invoked which begin bulk account creation at block 112 involving the creation of a multiple number of accounts corresponding to the number of transponders being ordered.

The operator retrieves from the transponder inventory 74 (FIG. 3) a batch of transponders where each batch of transponders has an associated identifying number. Computer entry of that number at 114 causes the display at block 118 of serial numbers associated with the selected transponders/tags 30 through a look up process involving the tag inventory database 116. The serial numbers are checked against the serial numbers printed on the physical transponders at decisional block 120 to validate the transponders being shipped to the tag vendor 76. If there are errors, corrective action is taken as indicated. Otherwise, the program automatically proceeds to the enter prepayment phase 122 where a credit is entered against the accounts of the selected transponders and the account opening for the selected batch of tags is completed at block 124.

The operator and/or program then proceed to attend to various other routine functions such as testing the tags, verifying the tag uniqueness, i.e. that no two tags have the same tag ID number, updating of the various databases and other tests that are run to ensure there are no missing tags, as generally indicated by block 126. The tag status may also be set to indicate that the tag is now on route to a tag vendor 76. The tag inventory should also be adjusted to account for the retrieved transponders.

At decisional block 128, the program determines whether all of the ordered transponders have been processed. If not, the program returns to block 114 to enable the operator to select another batch of transponders and repeat the above process. Once all of the transponders are ready, the proper billing and manifest documents are automatically prepared at block 130 and the entire package of transponders is send off to the shrink-wrap contractor 78 (FIG. 3) as indicated by the block 132. However, the final validation and activation of the transponder account is not completed until the transponders have safely reached the tag vendors 76. The function of the shrink-wrap contractor 78 is to assemble each transponder in its own box together with the other materials which constitute the sealed transponder kits 50 shown in FIG. 2.

Figure 6:
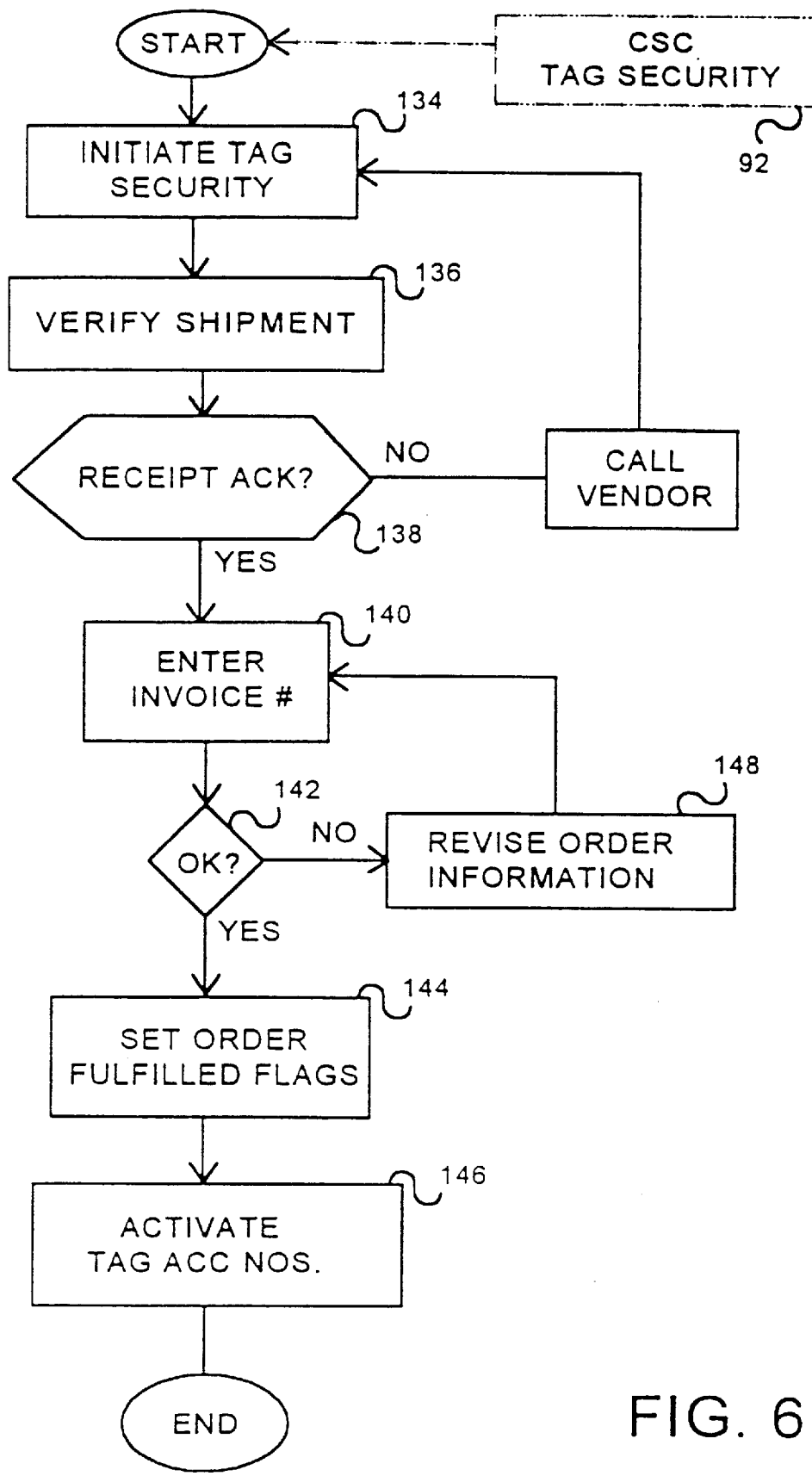
FIG. 6 is a program flowchart of the CSC computer software block which handles tag security.

Once the shrink-wrap contractor 78 has manufactured the sealed boxes and shipped them to the tag vendors 76, the tag vendors must initiate the final activation of the corresponding transponder accounts by calling the CSC 72 and going through the routine which is illustrated in FIG. 6.

The tag security and monitoring program 92 is initiated at 134 and then proceeds to verify shipment to the tag vendors at block 136 and receipt of acknowledgement as indicated in decisional block 138. If at the expected time of tag receipt at the vendors no call has been received from the tag vendor, the tag vendor may be called to resolve the problem. Otherwise, the program proceeds to the "enter invoice number" block 140 which validates receipt of the correct number of transponders by the tag vendor. If all is okay, the program proceeds from the decisional block 142 to the "set order fulfilled flag" block 144, and finally activates for immediate use the corresponding tag account numbers as indicated at 146. If there are any discrepancies in the ordering information, the block 148 is accessed and the process is repeated until all of the tags have been properly validated so that they can be sold to the public for immediate use.

Figure 7:
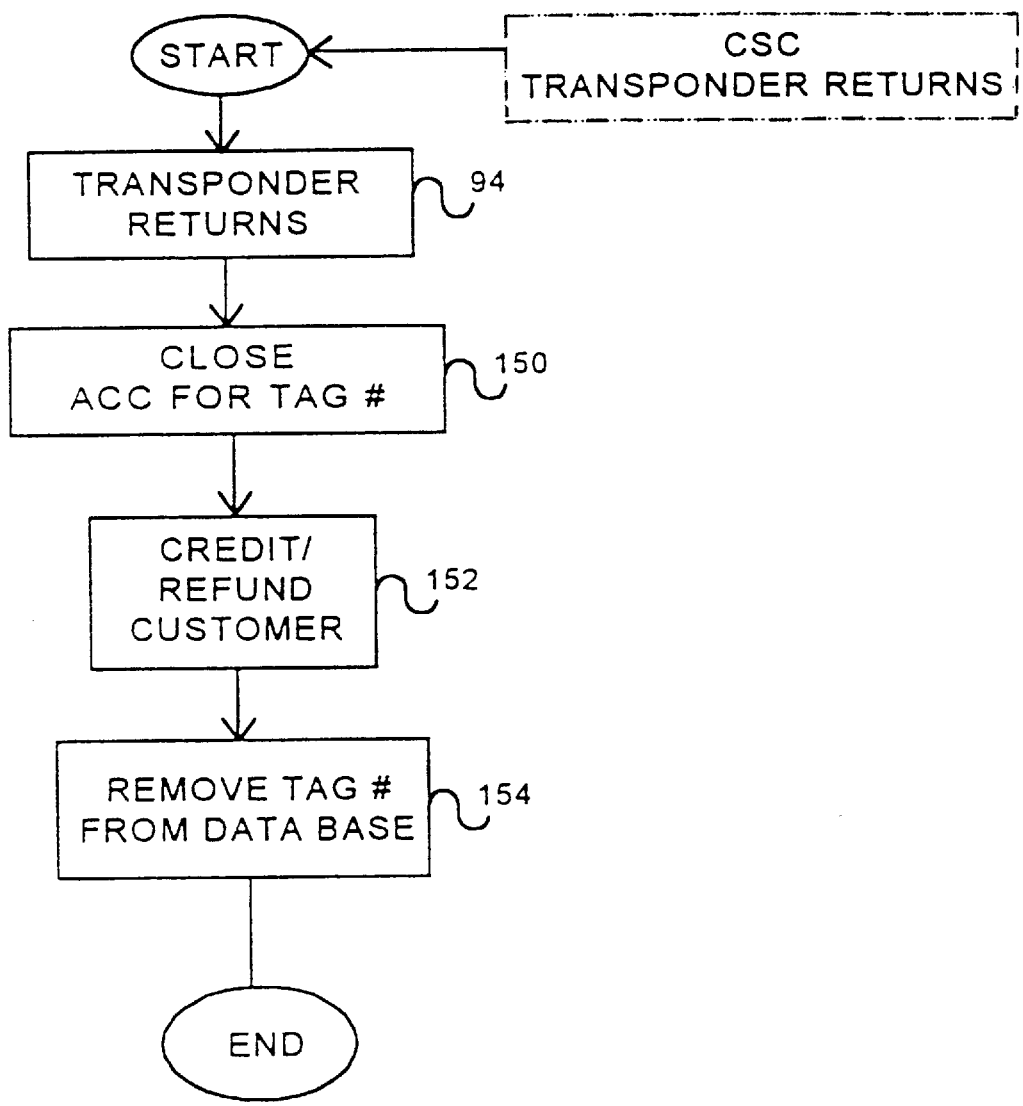
FIG. 7 is an overall program flowchart of a transponder returns function carried out at the CSC.

The transponder returns function of the central CSC system 70 is illustrated in FIG. 7. Thus, when a transponder 30 is returned by a customer to the customer service center 72, the software program executes the transponder return routines 94 by closing the account corresponding to returned transponder at the block 150. Furthermore, since the customer has left a deposit for the transponder, a credit or cash refund is issued or the balance transferred to another account as indicated at block 152. Still further, the program removes the tag number corresponding to the returned transponder from the database 116 as indicated at 154. The transponder can then be shipped back to the supplier 70 or otherwise repackaged for further use by another customer.

Figure 8:
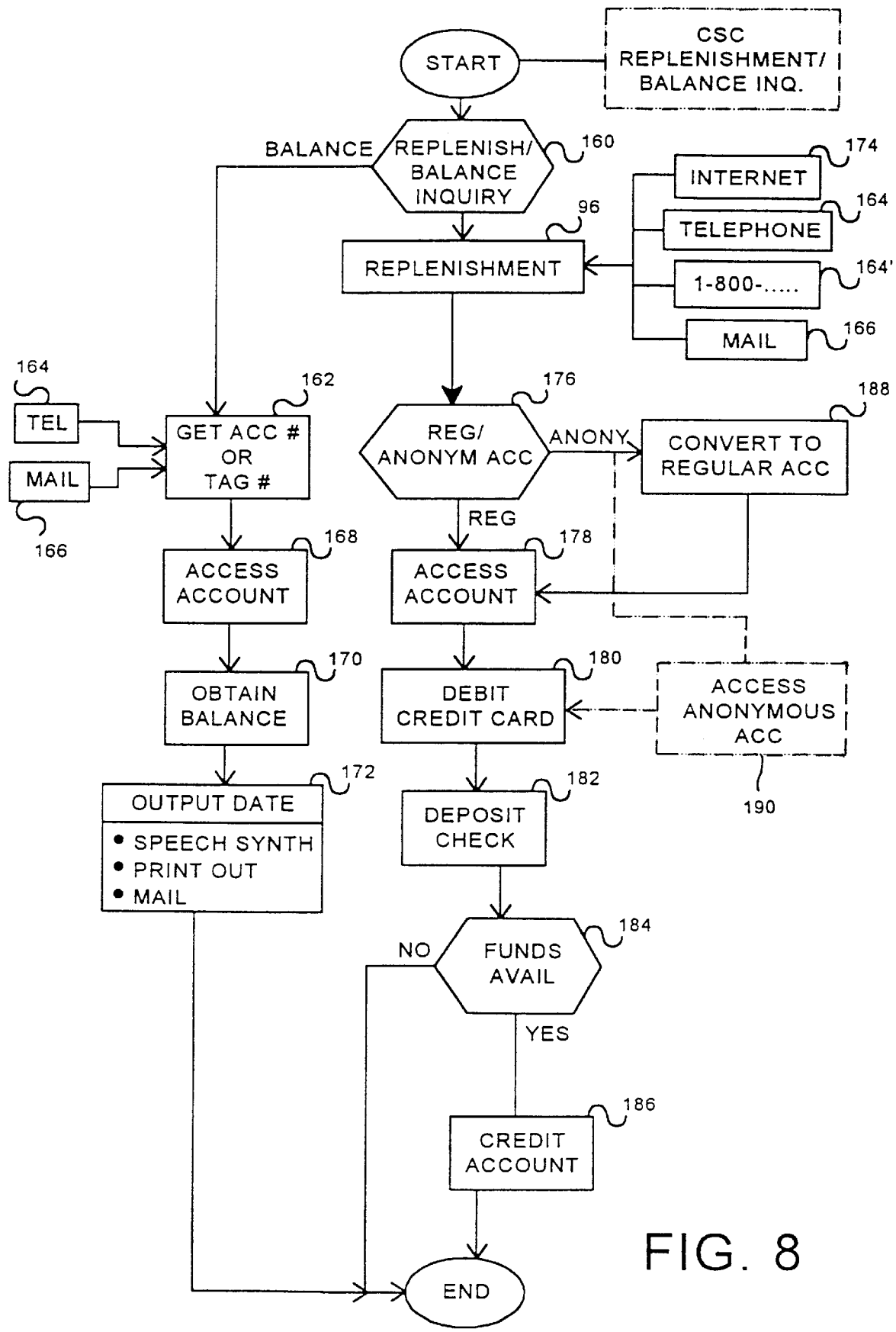
FIG. 8 is a software flowchart of the credit replenishment and balance inquiry portion of the central computer software.

FIG. 8 illustrates one of the key features of the present invention, involving account replenishment and the conversion of an anonymous transponder account to a regular transponder account. Thus, the software routines in FIG. 8 begin at decisional block 160 which determines whether the function to be performed is replenishment of a toll account or a toll credit balance inquiry. If a balance inquiry has been requested, the program proceeds to block 162 to access the relevant account based on an account number received through the telephone 164, the mail 166 or the like. Once the account has been accessed at block 168, the toll balance for that account is obtained at block 170 and that balance is output by any known means, as for example through a speech synthesizer, a hard copy printout or through the mail as generally indicated at 172.

The replenishment process can be accessed through the Internet 174, through an ordinary telephone 164, through a toll-free 800 number telephone inquiry 164', through ordinary mail 166 or any other mode. These requests which are supplied to the software replenishment block 96 are then processed beginning at the decisional block 176 which determines whether the replenishment is for a regular toll account or an anonymous account. If for a regular account, the account is accessed at 178 and the account balance is replenished through the debiting of a credit card at 180 or a deposited check at 182. This can be accomplished immediately or after it has been previously determined that the credit card or the check has cleared and that funds are available, as indicated at the decisional block 184 and block 186. If no funds are available, the program ends and is rerun several hours or days later when the funds may have become available.

If at the decisional block 176 it is noted that the account is an anonymous account, the program proceeds to block 188 and the account is then converted to a regular account in accordance with the intention of the method of the present invention. However, in accordance with an optional approach of the present invention, it is possible to replenish an anonymous account by receiving the appropriate funds and crediting the received amount to the anonymous account as indicated by the block 190.

Thus, the system described above achieves the aims of the present invention of facilitating and inducing larger segments of the motoring public to avail themselves of toll transponders by reducing bureaucracy, using simpler tag technology, delivering immediate utility, to permit automatic toll charging at toll plazas and reduce road congestion. One ancillary advantage of the present invention is that the toll authority is thus introduced to a large number of customers which eventually permits it to regularly charge their credit cards with monthly or weekly, etc. toll amounts.

For completeness, reference is also made to FIG. 9 which provides an overview of the basic transactions which occur at the toll plazas 22. This process involves the procurement and installation of a transponder in one's automobile, truck, motorcycle, etc. The toll plaza computer(s) 32 read the transponder tag ID number at block 194 and thereafter the corresponding account is accessed and a toll recorded. When the toll is being recorded, the amount available in the account is compared to the required toll to determine whether there is a sufficient toll balance in the account, as indicated at block 198. The comparison/validation process includes testing whether the tag number is valid, whether the charging of the toll will create a negative balance, or perhaps leave in the account a low balance, e.g. less than two or three toll charges. Depending on the result of the test at decisional block 200, the toll charge is approved and a green light 34 or the like is activated to indicate a valid toll charging transaction and to signal the motorist (or toll enforcement officials) accordingly. In the event that it is determined that the toll balance account is now at a low balance, the program proceeds by triggering a notice to the user such as by flashing a low balance light 34 to indicate to the motorist that it is time to replenish his or her corresponding prepaid toll account, as indicated at software block 202. As an option, the display may be more sophisticated and indicate the actual remaining balance or provide other information as indicated at block 204.

If the toll plaza computer detects an invalid tag or a negative balance during an attempt to charge a toll amount, a red light 34 could be flashed or an alarm can be sounded as indicated by software block 206. Moreover, the video camera 37 which is normally operated at the toll plaza can be used to store images of the plate number and other vehicle data as indicated in block 208 and a violation enforcement procedure may be initiated (see block 210) when and if the toll plaza is equipped to do so.

One of the shortcomings of the presently deployed E-ZPass system is that the central computer facility reconciles accounts typically only once during any twenty four hour period, usually sometimes past midnight. This offers less than ideal credit control and could result in motorists creating negative toll balances by repeatedly passing through toll plazas during same day. Accordingly, another important function of the present invention ensues from the fact that the CSC 72 communicates throughout the day with the plaza computers 32, constantly updating these computers to ensure that the toll credit accounts are maintained nearly up to date. This makes it very difficult for persons to inadvertently overdraw their toll credit accounts, and solves a present drawback of the E-ZPass toll collection system.

The method of the present invention further comprises software routines for carrying out geographical checks to ensure that the same transponder does not generate toll charges within a given time period at geographically remote toll plazas. These software routines are subsumed in the software that is being executed in the central CPU 80.

Although the present invention has been described above in connection with an automatic toll collection system, the concept thereof is applicable in identical systems used for collecting various fees, e.g. at parking garages, car wash establishments and the like.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for toll collection and administration, the method comprising:

providing a central computer containing a plurality of regular toll accounts, wherein each regular account is associated with a unique, corresponding individual or business entity;

providing a first plurality of transponders, each transponder having an associated unique vehicle tag number identifying the transponder and a circuit for wirelessly transmitting the tag number to a toll plaza receiver;

correlating in the central computer the first plurality of transponders with the regular account numbers so that each transponder is associated with a unique regular account number;

activating selected ones of the first, regular accounts in response to receipt of applications and prepayment fees from the individuals or business entities associated therewith;

pre-authorizing and activating a second plurality of anonymous toll accounts associated with a second plurality of transponders which are not associated with any individual or business entity and crediting each of the second anonymous accounts with selected predetermined prepaid toll amounts;

sensing the passage of transponders through a toll plaza and charging a toll against a corresponding one of the first and second plurality of accounts; and operating a software routine which bills a toll amount against the regular and anonymous toll accounts in response to the passage of the transponders through a toll plaza.

2. The method of claim 1, further including supplying each of the second transponders in a kit including:

the second transponder;

installation hardware and instructions; and an application form and return mail envelop to establish a replenishment mechanism for the second transponder.

3. The method of claim 2, in which the transponder kit is provided in a box which is shrink-wrapped.

4. The method of claim 2, further comprising executing software routines which are effective to convert anonymous toll accounts to regular toll accounts.

5. The method of claim 2, further including executing software routines which validate the anonymous toll accounts only after receipt of acknowledgement that transponder kits associated with those accounts have reached transponder vendor for sale to the public.

6. The method of claim 2, further including executing software routines which verify that no two transponders are assigned the same account.

7. The method of claim 2, further including executing software routines which result in the deactivation of anonymous toll accounts which have not been replenished after exhaustion of their prepaid toll amounts.

8. The method of claim 2, further comprising converting an anonymous toll account to a regular account by accessing the central computer through the Internet.

9. The method of claim 2, further comprising converting an anonymous toll account to a regular account by accessing the central computer through a telephone.

10. The method of claim 2, further comprising accessing the central computer to enable users to determine a current balance in at least one of the regular toll accounts and the anonymous toll accounts.

11. The method of claim 2, in which the sensing of the passage of the vehicles through a toll plaza and the charging of tolls is carried out by toll plaza computers and including updating the toll plaza computers as to toll charging transactions at least several times daily.

12. The method of claim 2, further comprising carrying out geographical checks to ensure that the same transponder does not generate toll charges within a given time at geographically remote toll plazas.

13. The method of claim 2, further including monitoring balances of accounts and generating a low or nil balance indication at the toll plaza to alert motorists when their account balance has fallen below a predetermined dollar value.

14. The method of claim 13, in which generating the low balance indication is carried out by flashing a light emitting device.

15. A toll collection transponder kit, for operation in conjunction with a central toll collection and administration system, the toll collection transponder kit comprising:

a sealed package;

transponder comprising a unique tag identifier built into the transponder and the transponder being associated with an anonymous toll account number in the central computer and a prepaid balance amount;

installation hardware for installing the transponder in a vehicle; and an application form for converting anonymous account into a regular account.

16. The toll collection transponder kit of claim 15, in which the sealed package further includes transponder installation hardware and a wallet-sized ID card.

* * * * *